(12) United States Patent
Koyama et al.

(10) Patent No.: US 10,100,220 B2
(45) Date of Patent: Oct. 16, 2018

(54) WATER-BASED COATING COMPOSITION AND METHOD FOR FORMING MULTILAYER COATING FILM USING SAID COMPOSITION

(75) Inventors: Yohei Koyama, Yokohama (JP); Souichi Mori, Yokohama (JP); Hisayuki Nakashima, Fujisawa (JP)

(73) Assignee: BASF Japan, Ltd., Tokyo (JP)

( * ) Notice: Subject to any disclaimer, the term of this patent is extended or adjusted under 35 U.S.C. 154(b) by 1272 days.

(21) Appl. No.: 14/240,098

(22) PCT Filed: Jun. 14, 2012

(86) PCT No.: PCT/IB2012/001184
§ 371 (c)(1),
(2), (4) Date: Apr. 18, 2014

(87) PCT Pub. No.: WO2013/027093
PCT Pub. Date: Feb. 28, 2013

(65) Prior Publication Data
US 2018/0022955 A1    Jan. 25, 2018

(30) Foreign Application Priority Data

Aug. 22, 2011 (JP) ................................ 2011-180650

(51) Int. Cl.
| | | |
|---|---|---|
| C09D 151/08 | (2006.01) | |
| C08G 18/42 | (2006.01) | |
| C08G 18/75 | (2006.01) | |
| B05D 7/00 | (2006.01) | |
| C08G 18/66 | (2006.01) | |
| C09D 175/06 | (2006.01) | |
| C08G 18/34 | (2006.01) | |

(52) U.S. Cl.
CPC ........... *C09D 151/08* (2013.01); *B05D 7/572* (2013.01); *C08G 18/348* (2013.01); *C08G 18/4211* (2013.01); *C08G 18/6659* (2013.01); *C08G 18/755* (2013.01); *C09D 175/06* (2013.01)

(58) Field of Classification Search
None
See application file for complete search history.

(56) References Cited

U.S. PATENT DOCUMENTS

| | | | |
|---|---|---|---|
| 6,632,915 B1 * | 10/2003 | Schwarte | ............. C08F 257/02 |
| | | | 523/201 |
| 2007/0106019 A1 | 5/2007 | Schwarte et al. | |
| 2012/0034370 A1 | 2/2012 | Kloppenborg et al. | |

FOREIGN PATENT DOCUMENTS

| | | |
|---|---|---|
| CN | 1842377 | 10/2006 |
| EP | 1164150 A1 | 12/2001 |
| GB | 2369365 A | 5/2002 |
| JP | 2004358462 A | 12/2004 |
| JP | 2007297545 A | 11/2007 |
| JP | 2008238481 A * | 10/2008 |
| WO | WO2009131234 A1 | 10/2009 |
| WO | WO2010082607 A1 | 7/2010 |

OTHER PUBLICATIONS

Machine Translation of JP 2008-238481; Oct. 9, 2008.*
International Search Report of International Application No. PCT/IB2012/001184 dated Sep. 13, 2012, 3 pages.
Written Opinion of International Application No. PCT/IB2012/001184 dated Sep. 13, 2012, 5 pages.
International Preliminary Report on Patentability of International Application No. PCT/IB2012/001184 dated Feb. 25, 2014, 6 pages.

* cited by examiner

*Primary Examiner* — Michael P. Rodriguez
(74) *Attorney, Agent, or Firm* — Armstrong Teasdale LLP

(57) ABSTRACT

Disclosed is a water-based coating composition having as a base resin, a core/shell type emulsion resin comprising an acrylic resin as the core portion and a polyurethane resin as the shell portion, wherein the mass ratio of the core portion and the shell portion in the aforementioned core/shell type emulsion resin is between 20/80 and 80/20, the aforementioned acrylic resin has a hydroxyl group value of 40 to 140 mg KOH/g and an acid value of 0 to 10 mg KOH/g, the aforementioned polyurethane resin has a hydroxyl group value of 20 to 80 mg KOH/g and an acid value of 10 to 60 mg KOH/g, and the total mass ratio of constituent units derived from dibasic acids and/or dihydric alcohols having 10 to 60 carbon atoms in the aforementioned polyurethane resin is 10 to 50 mass % relative to the solid resin content of the aforementioned polyurethane resin.

8 Claims, No Drawings

WATER-BASED COATING COMPOSITION AND METHOD FOR FORMING MULTILAYER COATING FILM USING SAID COMPOSITION

CROSS REFERENCE TO RELATED APPLICATIONS

This application is a National Phase Application of Patent Application PCT/IB2012/001184 filed on 14 Jun. 2012, which claims priority to JP 2011-180650, filed 22 Aug. 2011, both of which are hereby incorporated by reference in their entirety.

FIELD OF THE INVENTION

The present invention relates to a novel water-based coating composition able to be used in a variety of fields, and especially the field of automotive coatings, and a method for forming a multilayer coating film that uses said water-based coating composition.

BACKGROUND OF THE INVENTION

In general, methods for forming multilayer coating films on vehicle bodies are carried out by forming an electrodeposition film on an object to be coated, curing this film by heating and then forming a multilayer coating film comprising an intermediate coating film, abase coating film and a clear coating film. In addition, water-based coating materials have come to be used as intermediate coating materials and base coating materials in order to reduce the quantities of volatile organic components (VOCs) used.

Furthermore, due to demands for reduced energy consumption in recent years, base coating films and clear coating films are formed on preheated intermediate coating films formed on electrodeposition film without curing the intermediate coating film by heating, and these three films are then simultaneously cured by heating. This is a so-called 3 coat 1 bake (3C1B) method, and is a method that has come to be used as a method for forming multilayer coating films.

In order to form a multilayer coating film having excellent surface smoothness by effectively preventing mixing of an intermediate coating film and a base coating film in methods for forming multilayer coating films using this type of 3C1B method, it is effective to reduce the water absorption and water elution of an intermediate coating film formed from a water-based intermediate coating composition and incorporate an acrylic resin emulsion having a specific glass transition temperature, acid value and hydroxyl group value, a urethane resin emulsion having a specific acid value and a curing agent (see Japanese Unexamined Patent Application Publication No. 2004-358462).

In addition, in order to obtain a multilayer coating film having excellent appearance and water resistance by using a multilayer coating film formation method in which a first coating material, a second coating material and a clear coating material are coated using a 3C1B method, it is effective to incorporate specific quantities of an emulsion resin obtained by emulsion polymerizing a mixture of specific vinyl monomers, an amide group-containing water-soluble acrylic resin, a urethane resin emulsion and a curing agent as a water-based coating composition for forming the second coating material (see Japanese Unexamined Patent Application Publication No. 2007-297545). In addition, Patent Document 2 indicates that it is possible to impart a water-based coating composition with thixotropic properties by imparting the above-mentioned emulsion resin with a core/shell structure.

Furthermore, in order to form a multilayer coating film having excellent smoothness, vividness and chip resistance by using a multilayer coating film formation method in which a first water-based color coating material, a second water-based color coating material and a clear coating material are coated using a 3C1B method, it is effective to incorporate an acrylic resin, a curing agent and a urethane resin emulsion as the first water-based color coating material and also for a first color coating film formed from this first water-based color coating material to have a specific water swelling ratio and organic solvent swelling ratio (see WO 2010/082607). In addition, WO 2010/082607 indicates that the above-mentioned urethane resin emulsion is produced using a polyisocyanate component and a polyol component as raw materials and that a compound containing a hydrocarbon group having six or more carbon atoms is preferred as a raw material compound for this polyol component.

However, in cases where preliminary heating is not carried out after the first coating film is formed in a multilayer coating film formation method using a 3C1B method and the coating compositions disclosed in Japanese Unexamined Patent Application Publication No. 2004-358462, Japanese Unexamined Patent Application Publication No. 2007-297545, and WO 2010/082607 are used, layer mixing occurs between the first coating film and the second coating film and it is not possible to obtain a coating film having a good appearance.

SUMMARY OF THE INVENTION

Therefore, an object of the present invention is to provide a water-based coating composition capable of producing a coating film having excellent appearance and adhesion to an object to be coated without carrying out preliminary heating following the formation of a first base coating film in a method for forming a multilayer coating film by a 3C1B method, and a method for forming a multilayer coating film that uses this water-based coating composition.

As a result of diligent research into how to solve the aforementioned problems, the inventors of the present application found that using a water-based coating composition that contains a specific core/shell type emulsion resin, in which the core portion comprises an acrylic resin and the shell portion comprises a urethane resin and in which said polyurethane resin contains a specific proportion of constituent units derived from dibasic acids and/or dihydric alcohols having 10 to 60 carbon atoms, as abase resin was able to solve the above-mentioned problems, and thereby completed the present invention.

Specifically, the present invention relates to a water-based coating composition containing, as a base resin, a core/shell type emulsion resin comprising an acrylic resin as the core portion and a polyurethane resin as the shell portion, wherein the mass ratio of the core portion and the shell portion in the aforementioned core/shell type emulsion resin is between 20/80 and 80/20, the aforementioned acrylic resin has a hydroxyl group value of 40 to 140 mg KOH/g and an acid value of 0 to 10 mg KOH/g, the aforementioned polyurethane resin has a hydroxyl group value of 20 to 80 mg KOH/g and an acid value of 10 to 60 mg KOH/g, and the total mass ratio of constituent units derived from dibasic acids and/or dihydric alcohols having 10 to 60 carbon atoms in the aforementioned polyurethane resin is 10 to 50 mass % relative to the solid resin content of the aforementioned polyurethane resin.

Furthermore, the present invention also relates to a method for forming a multilayer coating film by coating a first water-based coating material (A) on an object to be coated so as to form a first coating film, coating a second water-based coating material (B) on the aforementioned uncured first coating film, without carrying out preliminary heating or thermal curing following the formation of said first coating film, so as to form a second coating film, coating a clear coating material (C) on the aforementioned uncured second coating film so as to form a clear coating film, and then simultaneously thermally curing these three coating films, wherein the aforementioned first water-based coating material (A) and second water-based coating material (B) are selected from among the water-based coating compositions of the present invention.

In addition, the present invention also relates to a coating film obtained using the method for forming a multilayer coating film described above.

By using the water-based coating composition of the present invention in a method for forming a multilayer coating film by a 3C1B method, it is possible to obtain a coating film having excellent appearance and adhesion to an object to be coated without carrying out preliminary heating following the formation of the first base coating film.

DETAILED DESCRIPTION OF A PREFERRED EMBODIMENT OF THE INVENTION

The core/shell type emulsion resin contained in the base resin of the water-based coating composition of the present invention is obtained by synthesizing the acrylic resin that forms the core portion in an aqueous solution or aqueous dispersion of the polyurethane resin that forms the shell portion. Here, because the polyurethane resin contains hydrophilic groups and the acrylic resin does not contain hydrophilic groups, the polyurethane resin acts as an emulsifying agent and is disposed on the outside of micelles, whereas the acrylic acid is disposed on the inside of micelles when these resins form micelles in water, and the resins thereby form a core/shell structure. Moreover, a core/shell structure means one in which two resin components having different resin compositions are present in a single micelle, with one resin component forming a central part (core portion) and the other resin component forming the outer shell part (shell portion).

The polyurethane resin that forms the shell portion of the core/shell type emulsion resin of the present invention can be obtained using a publicly known method, but a method such as that described below can be used. First, a resin that forms a segment, such as a polyester resin or polyurethane resin, is synthesized and this segment resin is reacted with a carboxyl group-containing diol and a polyisocyanate compound to produce a urethane prepolymer having a terminal isocyanate group. This urethane prepolymer can then be reacted with a polyhydric alcohol to give a polyurethane resin having a terminal hydroxyl group.

This segment resin can be a polyester resin, polyurethane resin and the like, but is preferably a polyester resin. A polyester resin can be obtained using a publicly known method that involves an esterification reaction that uses a polybasic acid and a polyhydric alcohol as raw materials.

This polybasic acid is generally a polybasic carboxylic acid, but it is possible to additionally use a monobasic fatty acid and the like if necessary. Polybasic carboxylic acids include phthalic acid, isophthalic acid, tetrahydrophthalic acid, tetrahydroisophthalic acid, hexahydrophthalic acid, hexahydroterephthalic acid, trimellitic acid, adipic acid, sebacic acid, succinic acid, azelaic acid, fumaric acid, maleic acid, itaconic acid, pyromellitic acid and the like, and anhydrides thereof. It is possible to use one of these polybasic acids or a combination of two or more types thereof.

This polyhydric alcohol can be a glycol or a trihydric or higher polyhydric alcohol. Glycols include ethylene glycol, propylene glycol, diethylene glycol, triethylene glycol, tetraethylene glycol, dipropylene glycol, polyethylene glycol, polypropylene glycol, neopentyl glycol, hexylene glycol, 1,3-butane diol, 1,4-butane diol, 1,5-pentane diol, 1,6-hexane diol, 2-butyl-2-ethyl-1,3-propane diol, methyl propane diol, cyclohexane dimethanol, 3,3-diethyl-1,5-pentane diol and the like. In addition, trihydric or higher polyhydric alcohols include glycerin, trimethylolethane, trimethylolpropane, pentaerythritol, dipentaerythritol and the like. It is possible to use one of these polyhydric alcohols or a combination of two or more types thereof.

The number average molecular weight of the segment resin is preferably 1,000 to 5,000, and preferred specific examples thereof are 1,000, 1,500, 2,000, 2,500, 3,000, 3,500, 4,000, 4,500, 5,000 and so on, all of which fall within the numerical range mentioned above.

Next, the thus obtained segment resin is reacted with a carboxyl group-containing diol and a polyisocyanate compound to produce a urethane prepolymer having a terminal isocyanate group.

The carboxyl group-containing diol that reacts with the segment resin can be, for example, dimethylolpropionic acid, dimethylolbutanoic acid, dimethylolpentanoic acid, dimethylolheptanoic acid, dimethyloloctanoic acid, dimethylolnonanoic acid and the like. Of these, dimethylolpropionic acid and dimethylolbutanoic acid are preferred from the perspectives of obtaining an excellent coating film, industrial costs and so on. It is possible to use one of these carboxyl group-containing diols or a combination of two or more types thereof.

In addition, the polyisocyanate compound that reacts with the segment resin can be, for example, an aromatic diisocyanate such as 4,4'-diphenylmethane diisocyanate, 2,4- or 2,6-tolylene diisocyanate, 1,5-naphthalene diisocyanate, or p- or m-phenylene diisocyanate, an alicyclic diisocyanate such as isophorone diisocyanate, 4,4'-dicyclohexylmethane diisocyanate, 1,4-cyclohexylene diisocyanate, a hydrogenated tolylene diisocyanate and the like, an aliphatic diisocyanate such as hexamethylene diisocyanate, or xylylene diisocyanate, m-tetramethylxylylene diisocyanate and the like. Of these, alicyclic diisocyanates are preferred from the perspective of yellowing resistance. It is possible to use one of these polyisocyanate compounds or a combination of two or more types thereof.

Finally, the thus obtained urethane prepolymer can be reacted with a polyhydric alcohol to produce a polyurethane resin having a terminal hydroxyl group.

The polyhydric alcohol that reacts with the urethane prepolymer can be, for example, ethylene glycol, propylene glycol, 1,3-butylene glycol, 1,4-butane diol, 1,6-hexane diol, diethylene glycol, dipropylene glycol, neopentyl glycol, triethylene glycol, hydrogenated bisphenol A, glycerin, trimethylolethane, trimethylolpropane, pentaerythritol, dipentaerythritol and the like. It is possible to use one of these polyhydric alcohols or a combination of 2 or more types thereof.

By introducing a specific proportion of a dibasic acid and/or dihydric alcohol having 10 to 60 carbon atoms in the polyurethane resin in the present invention, it is possible to obtain a coating film having an excellent appearance. The dibasic acid and/or dihydric alcohol having 10 to 60 carbon atoms may be introduced into the above-mentioned segment resin or into another component, but by using the dibasic acid and/or dihydric alcohol having 10 to 60 carbon atoms as a raw material used in the synthesis of the above-mentioned segment resin, it is possible to obtain a coating film having an even more excellent appearance.

From the perspective of the appearance of the coating film, the dibasic acid and/or dihydric alcohol preferably have 30 to 40 carbon atoms, and more preferably 34 to 38 carbon atoms. If the dibasic acid and/or dihydric alcohol has fewer than 10 carbon atoms, the polarity of the polyurethane resin of the shell portion increases, meaning that layer mixing occurs between the first water-based coating material and the second water-based coating material, which can cause the appearance of the coating film to deteriorate, and if the dibasic acid and/or dihydric alcohol has more than 60 carbon atoms, the water solubility of the polyurethane resin of the shell portion deteriorates, meaning that the acrylic resin that forms the core portion and the polyurethane resin that forms the shell portion can, in some cases, fail to form a core/shell structure.

The above-mentioned dibasic acid having 10 to 60 carbon atoms can be, for example, sebacic acid, 1,9-nonanedicarboxylic acid, 1,10-decanedicarboxylic acid, 1,11-undecanedicarboxylicacid, 1,12-dodecanedicarboxylic acid, 1,13-tridecanedicarboxylic acid, 1,14-tetradecanedicarboxylic acid, 1,15-pentadecanedicarboxylic acid, 1,16-hexadecanedicarboxylic acid, 2-hexadecylmalonic acid, 1,18-octadecanedicarboxylic acid, dimer acids, hydrogenated dimer acids and the like. Of these, dimer acids are preferred from the perspective of obtaining a coating film having a superior appearance. It is possible to use one of these dibasic acids having 10 to 60 carbon atoms or a combination of two or more types thereof.

The above-mentioned polyhydric alcohol having 10 to 60 carbon atoms can be, for example, 1,10-decanediol, 1,2-decane diol, 3,6-dimethyl-3,6-octane diol, 2,2-dibutylpropane-1,3-diol, 1,12-dodecane diol, 1,2-dodecane diol, 1,13-tridecane diol, 2,2-diisoamyl-1,3-propane diol, 1,14-tetradecane diol, 1,2-tetradecane diol, 1,15-pentadecane diol, 1,16-hexadecane diol, 1,2-hexadecane diol, 1,2-heptadecane diol, 1,12-octadecane diol, 2,2-di-n-octyl-1,3-propane diol, 1,20-eicosane diol, dimer diol and the like. Dimer diol is preferred from the perspective of obtaining a coating film having a superior appearance. It is possible to use one of these dihydric alcohols having 10 to 60 carbon atoms or a combination of two or more types thereof.

The total mass ratio of constituent units derived from dibasic acids and/or dihydric alcohols having 10 to 60 carbon atoms is 10 to 50 mass % relative to the solid resin content of the polyurethane resin that forms the shell portion and, from the perspective of the appearance of the coating film, is preferably 20 to 40 mass % and more preferably 30 to 35 mass %. If the total mass ratio of the dibasic acids and/or dihydric alcohols is lower than 10 mass %, the polarity of the polyurethane resin increases, meaning that layer mixing occurs between the first water-based coating material and the second water-based coating material, which can cause the appearance of the coating film to deteriorate, and if the total mass ratio of the dibasic acids and/or dihydric alcohols exceeds 50 mass %, dryness is too high, meaning that satisfactory flowability cannot be achieved and the appearance of the coating film can deteriorate.

The polyurethane resin that forms the shell portion has a sufficient quantity of hydrophilic groups in order to enable water solubility or water dispersibility and also has a functional group for reacting with a curing agent. Specific examples of this hydrophilic group include carboxyl groups, amino groups, methylol groups and the like.

The polyurethane resin that forms the shell portion has a hydroxyl group value of 20 to 80 mg KOH/g and, from the perspective of adhesion to an object to be coated, preferably 30 to 70 mg KOH/g and more preferably 35 to 45 mg KOH/g. If the hydroxyl value is lower than 20 mg KOH/g, adhesion to an object to be coated can deteriorate, and if the hydroxyl value exceeds 80 mg KOH/g, the polarity of the polyurethane resin increases, meaning that layer mixing occurs between the first water-based coating material and the second water-based coating material, which can cause the appearance of the coating film to deteriorate.

In addition, the acid value of the polyurethane resin that forms the shell portion is 10 to 60 mg KOH/g and, from the perspective of the appearance of the coating film, preferably 30 to 40 mg KOH/g. If the acid value is lower than 10 mg KOH/g, the emulsion stability of the polyurethane resin in an aqueous medium deteriorates, which can cause the appearance of the coating film to deteriorate, and if the acid value exceeds 60 mg KOH/g, the water solubility of the polyurethane resin becomes too high, meaning that layer mixing occurs between the first water-based coating material and the second water-based coating material, which can cause the appearance of the coating film to deteriorate.

The number average molecular weight of the polyurethane resin that forms the shell portion is not particularly limited, but is between 500 and 50,000. Specific examples of this number average molecular weight include 500, 1,500, 2,500, 3,500, 4,500, 5,500, 6,500, 7,500, 10,000, 15,000, 20,000, 30,000, 40,000 and 50,000, all of which fall within the numerical range mentioned above. Moreover, the number average molecular weight mentioned in the present specification is a value obtained by gel permeation chromatography (GPC) using polystyrene as a standard substance.

The acrylic resin that forms the core portion can be obtained using a publicly known method involving the use of a radical polymerization reaction using radically polymerizable monomers as raw material components, and is synthesized in an aqueous solution or aqueous dispersion of the polyurethane resin that forms the shell portion.

Radically polymerizable monomers include (meth)acrylic acid, methyl(meth)acrylate, ethyl (meth)acrylate, n-propyl (meth)acrylate, isopropyl (meth)acrylate, n-butyl (meth)acrylate, isobutyl (meth)acrylate, sec-butyl (meth)acrylate, hexyl (meth)acrylate, cyclohexyl (meth)acrylate, 2-ethylhexyl (meth)acrylate, octyl (meth)acrylate, lauryl (meth)acrylate, stearyl (meth)acrylate, allyl alcohol, 2-hydroxyethyl (meth)acrylate, 3-hydroxypropyl (meth)acrylate, 4-hydroxybutyl (meth)acrylate, styrene, (meth)acrylonitrile, (meth)acrylamide and the like. It is possible to use one of these radically polymerizable monomers or a combination of two or more types thereof.

It is possible to incorporate a radical polymerization initiator when synthesizing the acrylic resin. Examples of radical polymerization initiators include azo compounds such as 2,2'-azobisisobutyronitrile, 2,2'-azobis-2,4-dimethylvaleronitrile, 4,4'-azobis-4-cyanovaleric acid, 1-azobis-1-cyclohexanecarbonitrile and dimethyl-2,2'-azobisisobutyrate, or an organic peroxide such as methyl ethyl ketone peroxide, cyclohexanone peroxide, 3,5,5-trimethylcyclohexanone peroxide, 1,1-bis(t-butylperoxy)-3,3,5-trimethylcyclohexane, 1,1-bis(t-butylperoxy)cyclohexanone, 2,2-bis (t-butylperoxy)octane, t-butylhydroperoxide, diisopropylbenzene hydroperoxide, dicumyl peroxide, t-butylcumylperoxide, isobutylperoxide, lauroylperoxide, benzoyl peroxide, diisopropylperoxydicarbonate, t-butylperoxy-2-ethylhexanoate, t-butylperoxyneodecanoate, t-butylperoxylaurate, t-butylperoxybenzoate and t-butylperoxyisopropylcarbonate. It is possible to use one of these radical polymerization initiators or a combination of two or more types thereof.

The hydroxyl group value of the acrylic resin that forms the core portion is 40 to 140 mg KOH/g and, from the perspectives of coating film appearance and adhesion to an object to be coated, preferably 60 to 120 mg KOH/g and more preferably 75 to 85 mg KOH/g. If the hydroxyl group value is lower than 40 mg KOH/g, adhesion to an object to be coated can deteriorate, and if this hydroxyl group value exceeds 140 mg KOH/g, the polarity of the core portion becomes too high, meaning that the acrylic resin that forms the core portion and the polyurethane resin that forms the shell portion can, in some cases, fail to forma core/shell structure and the appearance of the coating film can deteriorate.

The acid value of the acrylic resin that forms the core portion is 0 to 10 mg KOH/g and, from the perspective of coating film appearance, preferably 0 to 5 mg KOH/g and more preferably 0 to 3 mg KOH/g. If this acid value exceeds 10 mg KOH/g, the acrylic resin that forms the core portion and the polyurethane resin that forms the shell portion can, in some cases, fail to form a core/shell structure.

The glass transition temperature (Tg) of the acrylic resin that forms the core portion is not particularly limited, but is, for example, 20 to 60° C. Specific examples thereof include 20, 25, 30, 35, 40, 45, 50, 55 and 60° C., all of which fall within the numerical range mentioned above.

Because the acrylic resin that forms the core portion is synthesized in an aqueous solution or aqueous dispersion of the polyurethane resin that forms the shell portion, it is difficult to accurately measure the number average molecular weight of the acrylic resin. In particular, the number average molecular weight of an acrylic resin varies according to the reaction temperature during synthesis and the quantity of radical polymerization initiator used in the synthesis. The reaction temperature during synthesis is, for example, 60 to 110° C., specific examples of which include 60, 70, 80, 90, 100 and 110° C., all of which fall within the numerical range mentioned above. In addition, the quantity of radical polymerization initiator used in the synthesis is, for example, 0.1 to 3.0 parts by mass relative to 100 parts by mass of the radically polymerizable monomers. Specific examples of this quantity include 0.1, 0.5, 1.0, 1.5, 2.0, 2.5 and 3.0 parts by mass, all of which fall within the numerical range mentioned above.

The mass ratio of the core portion and the shell portion in the core/shell type emulsion resin contained in the water-based coating composition of the present invention is between 20/80 and 80/20 and, from the perspective of coating film appearance, preferably between 35/65 and 65/35, and more preferably between 45/55 and 55/45. If the mass ratio of the core portion is lower than 20, the water solubility of the core/shell type emulsion resin increases, meaning that layer mixing occurs between the first water-based coating material and the second water-based coating material, which can cause the appearance of the coating film to deteriorate. However, if the mass ratio of the core portion exceeds 80, the particulate nature of the acrylic resin that forms the core portion is enhanced, meaning that the appearance of the coating film can deteriorate.

In order for the core/shell type emulsion resin to be present in a stable manner in the water-based coating composition of the present invention, it is preferable to neutralize all or some of the carboxyl groups in the aforementioned core/shell type emulsion resin by means of a basic substance and impart self-emulsifying properties.

The basic substance used in the neutralization can be, for example, ammonia, morpholine, an N-alkylmorpholine, monoisopropanolamine, methyl ethanolamine, methyl isopropanolamine, dimethyl ethanolamine, diisopropanolamine, diethanolamine, triethanolamine, diethyl ethanolamine, triethanolamine, methylamine, ethylamine, propylamine, butylamine, 2-ethylhexylamine, dimethylamine, diethylamine, dipropylamine, dibutylamine, trimethylamine, triethylamine, triisopropylamine, tributylamine and the like. It is possible to use one of these basic substances or a combination of two or more types thereof.

From the perspective of coating film appearance, the mass ratio of the above-mentioned core/shell type emulsion resin relative to total quantity of solid resin content in the base resin in the water-based coating composition of the present invention is preferably 5 to 80 mass %, and more preferably 10 to 40 mass %.

In addition to the above-mentioned core/shell type emulsion resin, the water-based coating composition of the present invention can contain a polyurethane resin, a polyester resin, an acrylic resin, a polyether resin and the like as a base resin. It is possible to use one of these base resins or a combination of two or more types thereof, but it is preferable to incorporate all four of these base resin types. The content of each of these four types of base resin is preferably 0 to 30 mass %, more preferably 5 to 30 mass %, and particularly preferably 10 to 30 mass %, relative to the total quantity of solid resin content in the base resin. These base resins should be in the form of an aqueous solution or an aqueous dispersion and can be publicly known base resins used in water-based coating materials.

In cases where a polyurethane resin is used as a base resin, the hydroxyl group value of this polyurethane resin is, for example, 10 to 140 mg KOH/g, specific examples of which include 10, 20, 40, 60, 80, 100, 120 and 140 mg KOH/g, all of which fall within the numerical range mentioned above.

The acid value of the polyurethane resin used as a base resin is, for example, 3 to 80 mg KOH/g, specific examples of which include 3, 5, 10, 20, 30, 40, 50, 60, 70 and 80 mg KOH/g, all of which fall within the numerical range measured above. In addition, the number average molecular weight of the polyurethane resin used as a base resin is, for example, 1,000 to 100,000, specific examples of which include 1,000, 5,000, 10,000, 20,000, 40,000, 60,000, 80,000 and 100,000, all of which fall within the range mentioned above.

In cases where a polyester resin is used as a base resin, the hydroxyl group value of this polyester resin is, for example, 20 to 120 mg KOH/g, specific examples of which include 20, 40, 60, 80, 100 and 120 mg KOH/g, all of which fall within the numerical range mentioned above.

The acid value of the polyester resin used as a base resin is, for example, 2 to 60 mg KOH/g, specific examples of which include 2, 5, 10, 20, 30, 40, 50 and 60 mg KOH/g, all of which fall within the numerical range measured above.

In addition, the number average molecular weight of the polyester resin used as a base resin is, for example, 500 to 100,000, specific examples of which include 500, 1,000, 5,000, 10,000, 20,000, 40,000, 60,000, 80,000 and 100,000, all of which fall within the range mentioned above.

In cases where an acrylic resin is used as a base resin, the hydroxyl group value of this acrylic resin is, for example, 10 to 200 mg KOH/g, specific examples of which include 10, 20, 40, 60, 80, 100, 120, 140, 160, 180 and 200 mg KOH/g, all of which fall within the numerical range mentioned above. The acid value of the acrylic resin used as a base resin is, for example, 0 to 20 mg KOH/g, specific examples of which include 0, 2, 4, 6, 8, 10, 12, 14, 16, 18 and 20 mg KOH/g, all of which fall within the numerical range measured above. In addition, the number average molecular weight of the acrylic resin used as a base resin is, for example, 1,000 to 1,000,000, specific examples of which include 1,000, 5,000, 10,000, 50,000, 100,000, 200,000, 400,000, 600,000, 800,000 and 1,000,000, all of which fall within the range mentioned above.

In addition, the glass transition temperature (Tg) of the acrylic resin used as a base resin is, for example, −40 to 80° C., specific examples of which include −40, −20, 0, 20, 40, 60 and 80° C., all of which fall within the range mentioned above.

In cases where a polyether resin is used as a base resin, the hydroxyl group value of this polyether resin is, for example, 10 to 300 mg KOH/g, specific examples of which include 10, 20, 40, 60, 80, 100, 120, 140, 160, 180, 200, 220, 240, 260, 280 and 300 mg KOH/g, all of which fall within the numerical range mentioned above.

In addition, the number average molecular weight of the acrylic resin used as a base resin is, for example, 100 to 100,000, specific examples of which include 100, 500, 1,000, 5,000, 10,000, 20,000, 40,000, 60,000, 80,000 and 100,000, all of which fall within the range mentioned above.

The total quantity of solid resin content of the base resins in the water-based coating composition of the present invention is preferably 60 to 95 mass %, and more preferably 70 to 90 mass %, relative to total weight of solid resin content in the water-based coating composition.

It is possible to incorporate a variety of pigments, such as coloring pigments, glittery pigments or body pigments, in the water-based coating composition of the present invention. Coloring pigments include inorganic pigments such as chrome yellow, yellow iron oxide, iron oxide, carbon black and titanium dioxide and organic pigments such as azo chelate type pigments, insoluble azo type pigments, condensed azo type pigments, phthalocyanine type pigments, indigo pigments, perinone type pigments, perylene type pigments, dioxane type pigments, quinacridone type pigments, isoindolinone type pigments and metal complex pigments. In addition, glittery pigments include aluminum flake pigments, alumina flake pigments, mica pigments, silica flake pigments, glass flake pigments and the like. In addition, body pigments include calcium carbonate, barite, precipitated barium sulfate, clay, talc and the like. It is possible to use one of these pigments or a combination of two or more types thereof.

In cases where a pigment is added to the water-based coating composition of the present invention, the mass ratio of the pigment is, for example, 3 to 200 mass % relative to the total quantity of solid resin content in the base resins, specific examples of which include 3, 5, 15, 30, 50, 70, 90, 110, 130, 150, 175 and 200 mass %, all of which fall within the numerical range mentioned above.

One or more types of additive such as surface modifiers, anti-foaming agents, surfactants, auxiliary film-forming agents, preservatives, ultraviolet radiation absorbers, photo-stabilizers and antioxidants, rheology control agents, and organic solvents may be incorporated in the water-based coating composition of the present invention.

The water-based coating composition of the present invention contains water as a medium, but is used after adding water if necessary and a small quantity of an organic solvent or an amine as the need dictates in order to dilute to an appropriate viscosity before coating.

The water-based coating composition of the present invention can be used as a first water-based coating material (A) and a second water-based coating material (B) in a multilayer coating film formation method in which the first water-based coating material (A) is applied to an object to be coated so as to form a first coating film, the second water-based coating material (B) is applied to the aforementioned uncured first coating film so as to form a second coating film, a clear coating material (C) is applied to the aforementioned uncured second coating film so as to form a clear coating film, and these three coating films are then simultaneously cured by heating.

In cases where the water-based coating composition of the present invention is used as the first water-based coating material (A) and the second water-based coating material (B) in the multilayer coating film formation method of the present invention, it is possible to ensure adhesion to an object to be coated without incorporating a curing agent in the second water-based coating material (B).

The curing agent in the water-based coating composition of the present invention can be, for example, an amino resin, a polyisocyanate compound, a blocked polyisocyanate compound, a polycarbodiimide compound and the like. Of these, polyisocyanate compounds and polycarbodiimide compounds are preferred from the perspective of coating film appearance. In addition, it is possible to use one of these curing agents or a combination of two or more types thereof.

Amino resins is a general name for resins obtained by adding and condensing formaldehyde to an amino group-containing compound, and specific examples of amino resins include melamine resins, urea resins, guanamine resins and the like. Of these, melamine resins are preferred. Furthermore, it is possible to use an alkyl ether-modified amino resin obtained by etherifying some or all of the methylol groups in said amino resin by means of one or more types of alcohol selected from among monohydric alcohols such as methanol, ethanol, propanol and butanol.

In cases where an amino resin is used as a curing agent, the mass ratio of the total quantity of solid resin content in the base resins and the amino resin in the water-based coating composition of the present invention is preferably between 40/60 and 80/20, and more preferably between 65/35 and 75/25, from the perspectives of adhesion to an object to be coated, water resistance and chip resistance.

Polyisocyanate compounds include aliphatic diisocyanates such as hexamethylene diisocyanate, trimethylhexamethylene diisocyanate and dimer acid diisocyanate, alicyclic diisocyanates such as isophorone diisocyanate, xylylene diisocyanate (XDI), metaxylylene diisocyanate and hydrogenated XDI, aromatic diisocyanates such as tolylene diisocyanate (TDI), 4,4'-diphenylmethane diisocyanate (MDI), hydrogenated TDI and hydrogenated MDI, and adducts, biurets and isocyanurates thereof.

Blocked isocyanate compounds include compounds obtained by blocking an isocyanate group in an isocyanate compound with, for example, an alcohol such as butanol, an oxime such as methyl ethyl ketooxime, a lactam such as ε-caprolactam, a diketone such as acetoacetic acid diester, an imidazole such as imidazole or 2-ethylimidazole or a phenolic compound such as m-cresol.

In cases where a polyisocyanate compound or blocked polyisocyanate compound is used as a curing agent, the NCO/OH molar ratio in the water-based coating composition of the present invention is preferably 0.5 to 1.5, and more preferably 0.8 to 1.2, from the perspective of coating film appearance and adhesion to an object to be coated.

Polycarbodiimide compounds are preferably hydrophilic polycarbodiimide compounds. Examples of hydrophilic polycarbodiimide compounds include compounds obtained by reacting a polycarbodiimide compound having at least two isocyanate groups per molecule with a polyol having a hydroxyl group at a molecular terminal at such proportions that the NCO/OH molar ratio is greater than 1 and then reacting with a hydrophilizing agent having an active hydrogen atom and a hydrophilic moiety.

In cases where a polycarbodiimide compound is used as a curing agent in the present invention, the NCN/COOH molar ratio in the water-based coating composition is preferably 0.5 to 2.0, and more preferably 0.8 to 1.5, from the perspectives of coating film appearance and adhesion to an object to be coated.

The form of the water-based coating composition of the present invention is not particularly limited as long as the form is water-based, such as water-soluble, water dispersible or a water-based emulsion.

The carrier coating material (C) used in the method for forming a multilayer coating film of the present invention can be an organic solvent-based coating material, a water-based coating material or a powder-based coating material. The base resin for the carrier coating material can be an acrylic resin, a polyester resin, an alkyd resin and the like and the curing system can be melamine curing, acid/epoxy curing, isocyanate curing and the like, but from the perspective of coating film appearance, is preferably acrylic resin/melamine curing, acrylic resin/isocyanate curing or acid/epoxy curing.

The method used to coat the coating materials in the method for forming a multilayer coating film of the present invention can be a method routinely used in the automobile industry, such as air spray coating, air atomization electrostatic coating or rotary atomization type bell coating.

In the method for forming a multilayer coating film of the present invention, the coating conditions for the water-based coating composition are preferably: temperature: 10 to 40° C., relative humidity 65 to 85%.

In the method for forming a multilayer coating film of the present invention, preliminary heating may be carried out after coating the first water-based coating material (A) or after coating the second water-based coating material (B), but when using the water-based coating composition of the present invention, it is possible to obtain an excellent coating film appearance even without carrying out preliminary heating after coating the first water-based coating material (A). Moreover, if preliminary heating is carried out, the temperature used is preferably 30 to 100° C. and the heating time is preferably 3 to 10 minutes. In the method for forming a multilayer coating film of the present invention, the temperature used to cure the multilayer coating film is preferably 60 to 170° C. and the curing by heating time is preferably 20 to 40 minutes.

In the method for forming a multilayer coating film of the present invention, in cases where the curing agent for the first water-based coating material (A) and second water-based coating material (B) is a polyisocyanate compound and/or a carbodiimide compound or cases where the curing agent for the first water-based coating material (A) is a polyisocyanate compound and/or a carbodiimide compound and the curing agent for the second water-based coating material (B) does not contain a polyisocyanate compound and/or a carbodiimide compound, it is possible to make the curing by heating temperature of the multilayer coating film 60 to 100° C. by using an isocyanate-curable clear coating material (C).

Moreover, the object to be coated in the method for forming a multilayer coating film of the present invention can be an object obtained by forming an electrostatic coating film on a metal, an object obtained by forming an intermediate coating film on an electrostatic coating film, a plastic and the like, but is preferably an object obtained by forming an electrostatic coating film on a metal.

In the method for forming a multilayer coating film of the present invention, it is possible to include a coating step that is commonly carried out in 3 coat 2 bake coating processes, such as coating a chipping primer or undercoat primer, before coating the first water-based coating material (A).

EXAMPLES

The present invention will now be explained in greater detail through the use of working examples, but the present invention is in no way limited to these working examples. Moreover, the terms "parts", "%" and "ratio" in the examples denote "parts by mass", "mass %" and "mass ratio" respectively unless otherwise indicated.

Production Example 1-1: Production of Polyester Resin Varnish (A1)

54.0 parts of dimer acid (product name "EMPOL1008", produced by Cognis, 36 carbon atoms), 8.0 parts of neopentyl glycol, 17.8 parts of isophthalic acid, 19.4 parts of 1,6-hexane diol and 0.8 parts of trimethylolpropane were charged in a reaction vessel equipped with a reflux condensing tube, to which a reaction water separation tube was fitted, a nitrogen gas introduction device, a thermometer and a stirring device, heated to 120° C. so as to dissolve the raw materials, and then heated to 160° C. under stirring. After maintaining the temperature at 160° C. for 1 hour the temperature was increased gradually to 230° C. over a period of 5 hours. The temperature was then maintained at 230° C. for 2 hours to allow a reaction to proceed, and the reaction was allowed to continue after reducing the temperature to 180° C. When the acid value of the resin reached 4 mg KOH/g, the temperature was reduced to 80° C. or lower and 31.6 parts of methyl ethyl ketone were added to produce a polyester resin varnish (A1). The characteristics of the polyester resin varnish (A1) were as follows: content of non-volatile components: 74.6 mass %, hydroxyl group value: 62 mg KOH/g, acid value of resin: 4 mg KOH/g, number average molecular weight: 1,800.

Production Examples 1-2 to 1-4: Production of Polyester Resin Varnishes (A2 to A4)

Based on the formulations shown in table 1, polyester resin varnishes (A2 to A4) were obtained using the same method as that used in Production Example 1-1. The characteristics of the obtained polyester resin varnishes are also shown in table 1.

TABLE 1

| Polyester resin varnish | A1 | A2 | A3 | A4 |
|---|---|---|---|---|
| Dimer acid (*1) | 54.0 | | | |
| 1,10-decanedicarboxylic acid | | 54.0 | | |
| Adipic acid | | | 21.0 | |

TABLE 1-continued

| Polyester resin varnish | A1 | A2 | A3 | A4 |
|---|---|---|---|---|
| Suberic acid | | | | 54.0 |
| Neopentyl glycol | 8.0 | 8.0 | 21.6 | 8.0 |
| Isophthalic acid | 17.8 | 8.3 | 35.0 | 3.1 |
| 1,6-hexane diol | 19.4 | 29.0 | 21.6 | 34.1 |
| Trimethylolpropane | 0.8 | 0.8 | 0.8 | 0.8 |
| (Amount of dehydration) | 7.2 | 10.1 | 12.7 | 11.7 |
| Methyl ethyl ketone | 31.6 | 30.6 | 29.7 | 30.0 |
| Total | 124.4 | 120.5 | 117.0 | 118.3 |
| Solid resin content (mass %) | 74.6% | 74.6% | 74.6% | 74.6% |
| Number average molecular weight | 1800 | 1800 | 1800 | 1800 |
| Hydroxyl group value (mg KOH/g) | 62 | 62 | 62 | 62 |
| Acid value of resin (mg KOH/g) | 4 | 4 | 4 | 4 |

Notes for table 1
(*1): Product name "EMPOL1008", produced by Cognis, 36 carbon atoms Production Example 2-1: Production of Polyurethane Resin (B1)

58.4 parts of the polyester resin solution (A1), 7.8 parts of dimethylolpropionic acid, 27.6 parts of isophorone diisocyanate, 1.4 parts of neopentyl glycol and 14.8 parts of methyl ethyl ketone were charged in a reaction vessel equipped with a nitrogen gas introduction device, a thermometer and a stirring device and heated to 80° C. under stirring, and the components were allowed to react while maintaining the temperature at 80° C. When the isocyanate value reached 0.43 meq/g, 4.8 parts of trimethylolpropane were added and the reaction was allowed to continue while maintaining the temperature at 80° C. When the isocyanate value reached 0.01 meq/g, 33.3 parts of the butyl cellosolve were added so as to terminate the reaction. The temperature was then increased to 100° C. and the methyl ethyl ketone was removed under reduced pressure. Furthermore, the temperature was then reduced to 50° C., 4.4 parts of dimethylethanolamine were added so as to neutralize the acid groups and 152.2 parts of deionized water were then added to produce a polyurethane resin (B1). The characteristics of the polyurethane resin (B1) were as follows: content of non-volatile components: 35 mass %, hydroxyl group value: 40 mg KOH/g, acid value: 35 mg KOH/g.

Production Examples 2-2 to 2-11: Production of Polyurethane Resins (B2 to B11)

Based on the formulations shown in table 2, polyurethane resins (B2 to B11) were obtained using the same method as that used in Production Example 2-1. The characteristics of the obtained polyurethane resins are also shown in tables 2 and 3. Moreover, B2 and B6 were produced using neopentyl glycol instead of the trimethylolpropane used when producing B1.

TABLE 2

| | Water-based polyurethane resin | | | | |
|---|---|---|---|---|---|
| | B1 | B2 | B3 | B4 | B5 |
| Polyester resin varnish A1 (*1) | 58.4 | 58.9 | 59.9 | | 23.9 |
| Polyester resin varnish A2 (*1) | | | | 22.2 | |
| Polyester resin varnish A3 (*1) | | | | 19.5 | |
| Polyester resin varnish A4 (*1) | | | | | |
| Dimer diol (*2) | | | | | 35.4 |
| Dimethylol propionic acid | 7.8 | 7.8 | 2.3 | 13.3 | 2.7 |
| Isophorone diisocyanate | 27.6 | 27.8 | 25.7 | 35.6 | 31.2 |
| Neopentyl glycol | 1.4 | 1.5 | 1.3 | 0.0 | 0.0 |
| Methyl ethyl ketone (*3) | 14.8 | 15.0 | 15.2 | 10.6 | 6.1 |
| Trimethylolpropane | 4.8 | | 10.7 | 9.4 | 6.8 |
| Neopentyl glycol | | 4.0 | | | |
| Butyl cellosolve | 33.3 | 33.3 | 33.3 | 33.3 | 33.3 |
| Dimethylethanolamine (*4) | 4.4 | 4.4 | 1.5 | 7.2 | 1.5 |
| Deionized water | 124.6 | 117.5 | 124.2 | 132.6 | 141.0 |
| Total | 243.1 | 231.8 | 242.3 | 255.3 | 268.2 |
| Solid resin content (mass %) | 35.0% | 35.0% | 35.0% | 35.0% | 35.0% |
| Hydroxyl group value (mg KOH/g) | 40 | 23 | 78 | 78 | 40 |
| Acid value of resin (mg KOH/g) | 35 | 35 | 12 | 57 | 12 |
| Number average molecular weight | 4900 | 4300 | 3100 | 2700 | 7300 |
| Proportion of dibasic acid and/or dihydric alcohol having 10 to 60 carbon atoms (mass %) | 32 | 32 | 32 | 12 | 48 |

TABLE 3

| | Water-based polyurethane resin | | | | | |
|---|---|---|---|---|---|---|
| | B6 | B7 | B8 | B9 | B10 | B11 |
| Polyester resin varnish A1 (*1) | 59.2 | 59.6 | 59.4 | 43.6 | | 13.5 |
| Polyester resin varnish A2 (*1) | | | | | | |
| Polyester resin varnish A3 (*1) | | | | | | 29.7 |
| Polyester resin varnish A4 (*1) | | | | | 58.4 | |
| Dimer diol (*2) | | | | | | |
| Dimethylol propionic acid | 7.8 | 5.9 | 0.9 | 15.2 | 7.8 | 8.0 |
| Isophorone diisocyanate | 28.0 | 25.0 | 28.2 | 36.0 | 27.6 | 37.5 |
| Neopentyl glycol | 1.5 | 0.0 | 5.4 | 0.0 | 1.4 | 5.2 |
| Methyl ethyl ketone (*3) | 15.0 | 15.1 | 15.1 | 11.1 | 14.8 | 11.0 |
| Trimethylolpropane | | 9.6 | 6.1 | 5.2 | 4.8 | 6.2 |
| Neopentyl glycol | 3.5 | | | | | |
| Butyl cellosolve | 33.3 | 33.3 | 33.3 | 33.3 | 33.3 | 33.3 |
| Dimethylethanolamine (*4) | 4.4 | 3.4 | 0.8 | 8.2 | 4.4 | 4.4 |
| Deionized water | 118.0 | 124.3 | 124.4 | 131.6 | 124.9 | 131.8 |
| Total | 232.8 | 242.5 | 242.7 | 253.8 | 243.4 | 254.1 |
| Solid resin content (mass %) | 35.0% | 35.0% | 35.0% | 35.0% | 35.0% | 35.0% |
| Hydroxyl group value (mg KOH/g) | 17 | 82 | 40 | 40 | 40 | 40 |
| Acid value of resin (mg KOH/g) | 35 | 27 | 6 | 65 | 35 | 35 |
| Number average molecular weight | 5600 | 2400 | 6300 | 5200 | 4900 | 6700 |
| Proportion of dibasic acid and/or dihydric alcohol having 10 to 60 carbon atoms (mass %) | 32 | 32 | 32 | 24 | 32 | 7 |

Notes for tables 2 and 3
(*1): The solvent contained in the polyester resin varnish is removed under reduced pressure, and is therefore not included in the "Total" in tables 2 and 3.
(*2): Product name "PRIPOL2023", produced by Croda, 36 carbon atoms
(*3): This component is removed under reduced pressure, and is therefore not included in the "Total" in tables 2 and 3.
(*4): This component is used as a neutralizing agent, and is not included in the "solid resin content" in tables 2 and 3.

Production Example 3-1: Production of Core/Shell Type Emulsion (C1)

46.4 parts of the polyurethane resin (B1) and 33.1 parts of deionized water were charged in a reaction vessel equipped with a nitrogen gas introduction device, a thermometer, an addition funnel and a stirring device and heated to 85° C. under stirring, after which a homogeneous mixture comprising 4.9 parts of styrene, 4.5 parts of methyl methacrylate, 3.9 parts of n-butyl acrylate, 3.0 parts of 2-hydroxyethyl methacrylate, 3.8 parts of propylene glycol monomethyl ether and 0.24 parts of the polymerization initiator t-butylperoxy-2-ethylhexanoate was added dropwise at a constant rate over a period of 3.5 hours using the addition funnel. Following completion of this dropwise addition, the temperature was maintained at 85° C. for 1 hour, after which a polymerization initiator solution obtained by dissolving 0.03 parts of the polymerization initiator t-butylperoxy-2-ethylhexanoate in 0.14 parts of propylene glycol monomethyl ether was added as an additional catalyst, and after maintaining the temperature at 85° C. for a further 1 hour, the reaction was terminated so as to obtain a core/shell type emulsion resin (this resin is referred to as core/shell type emulsion (C1). Hereinafter also, incases where a code number is appended after a core/shell type emulsion resin, the resin between the "core/shell type emulsion" and the following code number will be omitted).

Production Examples 3-2 to 3-21: Production of Core/Shell Type Emulsions (C2 to C21)

Based on the formulations shown in tables 4 and 5, core/shell type emulsions (C2 to C21) were obtained using the same method as that used in Production Example 3-1. The characteristics of the obtained core/shell type emulsions are also shown in tables 4 and 5.

TABLE 4

| Core/shell type emulsion resin | | C1 | C2 | C3 | C4 | C5 | C6 | C7 | C8 | C9 | C10 |
|---|---|---|---|---|---|---|---|---|---|---|---|
| Initial charge | Water-based polyurethane resin B1 | 46.4 | 71.5 | 20.4 | 46.4 | 46.4 | | | | | 46.4 |
| | Water-based polyurethane resin B2 | | | | | | 46.4 | | | | |
| | Water-based polyurethane resin B3 | | | | | | | | 46.4 | | |
| | Water-based polyurethane resin B4 | | | | | | | | | 46.4 | |

TABLE 4-continued

| Core/shell type emulsion resin | | C1 | C2 | C3 | C4 | C5 | C6 | C7 | C8 | C9 | C10 |
|---|---|---|---|---|---|---|---|---|---|---|---|
| | Water-based polyurethane resin B5 | | | | | | | | | 46.4 | |
| | Water-based polyurethane resin B6 | | | | | | | | | | |
| | Water-based polyurethane resin B7 | | | | | | | | | | |
| | Water-based polyurethane resin B8 | | | | | | | | | | |
| | Water-based polyurethane resin B9 | | | | | | | | | | |
| | Water-based polyurethane resin B10 | | | | | | | | | | |
| | Water-based polyurethane resin B11 | | | | | | | | | | |
| | Deionized water | 33.1 | 19.3 | 48.3 | 33.0 | 33.1 | 33.1 | 33.1 | 33.1 | 33.1 | 33.1 |
| Dropwise addition components | Styrene | 4.9 | 2.2 | 7.6 | 4.9 | 4.9 | 4.9 | 4.9 | 4.9 | 4.9 | 4.9 |
| | Methyl methacrylate | 4.5 | 2.1 | 7.0 | 2.8 | 5.5 | 5.5 | 2.8 | 2.8 | 4.5 | 4.3 |
| | n-butyl acrylate | 3.9 | 1.8 | 6.1 | 3.5 | 4.2 | 4.2 | 3.5 | 3.5 | 3.9 | 3.9 |
| | 2-hydroxy ethyl methacrylate | 3.0 | 1.4 | 4.7 | 5.1 | 1.6 | 1.6 | 5.1 | 5.1 | 3.0 | 3.0 |
| | Acrylic acid | | | | | | | | | | 0.2 |
| | t-butylperoxy-2-ethylhexanoate | 0.2 | 0.1 | 0.4 | 0.2 | 0.2 | 0.2 | 0.2 | 0.2 | 0.2 | 0.2 |
| | Propylene glycol monomethyl ether | 3.8 | 1.5 | 5.2 | 3.9 | 3.9 | 3.9 | 3.9 | 3.9 | 3.8 | 3.9 |
| Additional catalyst | t-butylperoxy-2-ethylhexanoate | 0.03 | 0.03 | 0.03 | 0.03 | 0.03 | 0.03 | 0.03 | 0.03 | 0.03 | 0.03 |
| | Propylene glycol monomethyl ether | 0.14 | 0.09 | 0.31 | 0.14 | 0.14 | 0.14 | 0.14 | 0.14 | 0.14 | 0.14 |
| Total | | 100.0 | 100.0 | 100.0 | 100.0 | 100.1 | 100.1 | 100.1 | 100.1 | 100.0 | 100.1 |
| Characteristics of acrylic resin | Solid resin content (mass %) | 32.5 | 32.5 | 32.5 | 32.5 | 32.5 | 32.5 | 32.5 | 32.5 | 32.5 | 32.5 |
| | Hydroxyl group value (mg KOH/g) | 80 | 80 | 80 | 135 | 43 | 43 | 135 | 135 | 80 | 80 |
| | Acid value (mg KOH/g) | 0 | 0 | 0 | 0 | 0 | 0 | 0 | 0 | 0 | 9 |
| Core/shell mass ratio | | 50/50 | 23/77 | 78/22 | 50/50 | 50/50 | 50/50 | 50/50 | 50/50 | 50/50 | 50/50 |

TABLE 5

| Core/shell type emulsion resin | | C11 | C12 | C13 | C14 | C15 | C16 | C17 | C18 | C19 | C20 | C21 |
|---|---|---|---|---|---|---|---|---|---|---|---|---|
| Initial charge | Water-based polyurethane resin B1 | 46.4 | 46.4 | 76.1 | 15.8 | | | | | | | 46.4 |
| | Water-based polyurethane resin B2 | | | | | | | | | | | |
| | Water-based polyurethane resin B3 | | | | | | | | | | | |
| | Water-based polyurethane resin B4 | | | | | | | | | | | |
| | Water-based polyurethane resin B5 | | | | | | | | | | | |
| | Water-based polyurethane resin B6 | | | | | 46.4 | | | | | | |
| | Water-based polyurethane resin B7 | | | | | | 46.4 | | | | | |
| | Water-based polyurethane resin B8 | | | | | | | 46.4 | | | | |
| | Water-based polyurethane resin B9 | | | | | | | | 46.4 | | | |
| | Water-based polyurethane resin B10 | | | | | | | | | 46.4 | | |
| | Water-based polyurethane resin B11 | | | | | | | | | | 46.4 | |
| | Deionized water | 33.0 | 33.0 | 16.6 | 51.0 | 33.0 | 33.0 | 33.0 | 33.0 | 33.0 | 33.0 | 33.0 |
| Dropwise addition components | Styrene | 4.9 | 4.9 | 1.8 | 8.1 | 4.9 | 4.9 | 4.9 | 4.9 | 4.9 | 4.9 | 4.9 |
| | Methyl methacrylate | 5.7 | 2.5 | 1.6 | 7.4 | 5.7 | 5.7 | 5.7 | 5.7 | 5.7 | 5.7 | 4.2 |
| | n-butyl acrylate | 4.3 | 3.4 | 1.4 | 6.5 | 4.3 | 4.3 | 4.3 | 4.3 | 4.3 | 4.3 | 3.9 |
| | 2-hydroxy ethyl methacrylate | 1.4 | 5.4 | 1.1 | 5.0 | 1.4 | 1.4 | 1.4 | 1.4 | 1.4 | 1.4 | 3.0 |
| | Acrylic acid | | | | | | | | | | | 0.3 |

TABLE 5-continued

| Core/shell type emulsion resin | | C11 | C12 | C13 | C14 | C15 | C16 | C17 | C18 | C19 | C20 | C21 |
|---|---|---|---|---|---|---|---|---|---|---|---|---|
| | t-butylperoxy-2-ethylhexanoate | 0.2 | 0.2 | 0.1 | 0.4 | 0.2 | 0.2 | 0.2 | 0.2 | 0.2 | 0.2 | 0.2 |
| | Propylene glycol monomethyl ether | 3.9 | 3.9 | 1.2 | 5.5 | 3.9 | 3.9 | 3.9 | 3.9 | 3.9 | 3.9 | 3.9 |
| Additional catalyst | t-butylperoxy-2-ethylhexanoate | 0.03 | 0.03 | 0.03 | 0.03 | 0.03 | 0.03 | 0.03 | 0.03 | 0.03 | 0.03 | 0.03 |
| | Propylene glycol monomethyl ether | 0.14 | 0.14 | 0.07 | 0.33 | 0.14 | 0.14 | 0.14 | 0.14 | 0.14 | 0.14 | 0.14 |
| Total | | 100.0 | 100.0 | 100.0 | 100.0 | 100.0 | 100.0 | 100.0 | 99.9 | 100.0 | 100.0 | 100.0 |
| Characteristics of acrylic resin | Solid resin content (mass %) | 32.5 | 32.5 | 32.5 | 32.5 | 32.5 | 32.5 | 32.5 | 32.5 | 32.5 | 32.5 | 32.5 |
| | Hydroxyl group value (mg KOH/g) | 37 | 144 | 80 | 80 | 80 | 80 | 80 | 80 | 80 | 80 | 80 |
| | Acid value (mg KOH/g) | 0 | 0 | 0 | 0 | 0 | 0 | 0 | 0 | 0 | 0 | 12 |
| Core/shell mass ratio | | 50/50 | 50/50 | 18/82 | 83/17 | 50/50 | 50/50 | 50/50 | 50/50 | 50/50 | 50/50 | 50/50 |

Production Example 4-1: Production of First Water-Based Coating Material (D1)

Using the core/shell type emulsion (C1) and a water-based polyester resin (product name "SETAQUA6407", produced by Nuplex Resins, acid value 11 mg KOH/g, hydroxyl group value 89 mg KOH/g) as dispersing resins, a pigment paste was produced by dispersing titanium dioxide (product name "R706", produced by DuPont) and carbon black (product name "MA-100", produced by Mitsubishi Chemical Corporation) in a motor mill. Next, the core/shell type emulsion (C1), the aforementioned water-based polyester resin, 23.7 parts of the water-based polyurethane resin (B1), 5.9 parts of a water-based acrylic resin (product name "SETAQUA6511", produced by Nuplex Resins, acid value 8 mg KOH/g, hydroxyl group value 138 mg KOH/g, glass transition temperature 12° C.) and 4.1 parts of a water-based polyether resin (product name "Yuniol TG-1000", produced by NOF Corporation, acid value 0 mg KOH/g, hydroxyl group value 168 mg KOH/g, number average molecular weight 1,000) were mixed in a dissolver, and a primary component was obtained by adding and dispersing the aforementioned pigment paste in the aforementioned mixture so that the content of the core/shell type emulsion (C1) was 25.5 parts, the content of the aforementioned water-based polyester resin was 16.0 parts and the P/B (pigment/binder) ratio was 1.0 (mass ratio) in the first water-based coating material (D1). Finally, a first water-based coating material (D1) was obtained by adding and blending 13.2 parts of a melamine resin (product name "Cymel 327", produced by Cytec Industries) as a curing agent.

Production Examples 4-2 to 4-30: Production of First Water-Based Coating Materials (D2 to D30)

Based on the formulations shown in tables 6 to 9, first water-based coating materials (D2 to D30) were obtained using the same method as that used in Production Example 4-1.

TABLE 6

| First water-based coating material | | D1 | D2 | D3 | D4 | D5 | D6 | D7 | D8 |
|---|---|---|---|---|---|---|---|---|---|
| Base resin | Core/shell type emulsion C1 | 25.5 | 8.5 | 42.5 | 68.1 | 85.1 | | | |
| | Core/shell type emulsion C2 | | | | | | 25.5 | | |
| | Core/shell type emulsion C3 | | | | | | | 25.5 | |
| | Core/shell type emulsion C4 | | | | | | | | 25.5 |
| | Core/shell type emulsion C5 | | | | | | | | |
| | Core/shell type emulsion C6 | | | | | | | | |
| | Core/shell type emulsion C7 | | | | | | | | |
| | Core/shell type emulsion C8 | | | | | | | | |
| | Core/shell type emulsion C9 | | | | | | | | |
| | Core/shell type emulsion C10 | | | | | | | | |
| | Water-based polyurethane resin B1 | 23.7 | 39.5 | 7.9 | 4.0 | | 23.7 | 23.7 | 23.7 |
| | Water-based polyester resin | 16.0 | 16.0 | 16.0 | 5.3 | | 16.0 | 16.0 | 16.0 |
| | Water-based acrylic resin | 5.9 | 5.9 | 5.9 | 2.9 | | 5.9 | 5.9 | 5.9 |
| | Water-based polyether resin | 4.1 | 4.1 | 4.1 | 1.4 | | 4.1 | 4.1 | 4.1 |
| Curing agent | Melamine resin (*1) | 13.2 | 13.2 | 13.2 | 13.2 | 13.2 | 13.2 | 13.2 | 13.2 |
| | Polyisocyanate (*2) | | | | | | | | |
| | Polycarbodiimide (*3) | | | | | | | | |
| Pigment | Titanium dioxide | 39.1 | 39.1 | 39.1 | 39.1 | 39.1 | 39.1 | 39.1 | 39.1 |
| | Carbon black | 0.4 | 0.4 | 0.4 | 0.4 | 0.4 | 0.4 | 0.4 | 0.4 |
| Total | | 127.9 | 126.7 | 129.1 | 134.3 | 137.7 | 127.8 | 127.8 | 127.8 |
| Base resin content | Core/shell type emulsion resin | 30% | 10% | 50% | 80% | 100% | 30% | 30% | 30% |
| | Water-based polyurethane resin | 30% | 50% | 10% | 5% | | 30% | 30% | 30% |
| | Water-based polyester resin | 15% | 15% | 15% | 5% | | 15% | 15% | 15% |

TABLE 6-continued

| First water-based coating material | | D1 | D2 | D3 | D4 | D5 | D6 | D7 | D8 |
|---|---|---|---|---|---|---|---|---|---|
| | Water-based acrylic resin | 10% | 10% | 10% | 5% | | 10% | 10% | 10% |
| | Water-based polyether resin | 15% | 15% | 15% | 5% | | 15% | 15% | 15% |
| Total content of base resin relative to total solid resin content in first water-based coating material | | 71% | 71% | 71% | 71% | 71% | 71% | 71% | 71% |
| Curing agent content | Melamine resin (*1) | 30% | 30% | 30% | 30% | 30% | 30% | 30% | 30% |
| | Polyisocyanate (*2) | | | | | | | | |
| | Polycarbodiimide (*3) | | | | | | | | |
| | NCO/OH | | | | | | | | |
| | CI/COOH | | | | | | | | |
| P/B | | 1.0 | 1.0 | 1.0 | 1.0 | 1.0 | 1.0 | 1.0 | 1.0 |

TABLE 7

| First water-based coating material | | D9 | D10 | D11 | D12 | D13 | D14 | D15 | D16 |
|---|---|---|---|---|---|---|---|---|---|
| Base resin | Core/shell type emulsion C1 | | | | | | | 25.5 | 25.5 |
| | Core/shell type emulsion C2 | | | | | | | | |
| | Core/shell type emulsion C3 | | | | | | | | |
| | Core/shell type emulsion C4 | | | | | | | | |
| | Core/shell type emulsion C5 | 25.5 | | | | | | | |
| | Core/shell type emulsion C6 | | 25.5 | | | | | | |
| | Core/shell type emulsion C7 | | | 25.5 | | | | | |
| | Core/shell type emulsion C8 | | | | 25.5 | | | | |
| | Core/shell type emulsion C9 | | | | | 25.5 | | | |
| | Core/shell type emulsion C10 | | | | | | 25.5 | | |
| | Water-based polyurethane resin B1 | 23.7 | 23.7 | 23.7 | 23.7 | 23.7 | 23.7 | 23.7 | 23.7 |
| | Water-based polyester resin | 16.0 | 16.0 | 16.0 | 16.0 | 16.0 | 16.0 | 16.0 | 16.0 |
| | Water-based acrylic resin | 5.9 | 5.9 | 5.9 | 5.9 | 5.9 | 5.9 | 5.9 | 5.9 |
| | Water-based polyether resin | 4.1 | 4.1 | 4.1 | 4.1 | 4.1 | 4.1 | 4.1 | 4.1 |
| Curing agent | Melamine resin (*1) | 13.2 | 13.2 | 13.2 | 13.2 | 13.2 | 13.2 | | |
| | Polyisocyanate (*2) | | | | | | | 8.6 | |
| | Polycarbodiimide (*3) | | | | | | | | 8.6 |
| Pigment | Titanium dioxide | 39.1 | 39.1 | 39.1 | 39.1 | 39.1 | 39.1 | 35.9 | 30.7 |
| | Carbon black | 0.4 | 0.4 | 0.4 | 0.4 | 0.4 | 0.4 | 0.4 | 0.4 |
| Total | | 127.8 | 127.8 | 127.8 | 127.8 | 127.8 | 127.8 | 120.1 | 114.9 |
| Base resin content | Core/shell type emulsion resin | 30% | 30% | 30% | 30% | 30% | 30% | 30% | 30% |
| | Water-based polyurethane resin | 30% | 30% | 30% | 30% | 30% | 30% | 30% | 30% |
| | Water-based polyester resin | 15% | 15% | 15% | 15% | 15% | 15% | 15% | 15% |
| | Water-based acrylic resin | 10% | 10% | 10% | 10% | 10% | 10% | 10% | 10% |
| | Water-based polyether resin | 15% | 15% | 15% | 15% | 15% | 15% | 15% | 15% |
| Total content of base resin relative to total solid resin content in first water-based coating material | | 71% | 71% | 71% | 71% | 71% | 71% | 76% | 84% |
| Curing agent content | Melamine resin (*1) | 30% | 30% | 30% | 30% | 30% | 30% | | |
| | Polyisocyanate (*2) | | | | | | | 24% | |
| | Polycarbodiimide (*3) | | | | | | | | 11% |
| | NCO/OH (molar ratio) | | | | | | | 1.0 | |
| | CI/COOH (molar ratio) | | | | | | | | 1.0 |
| P/B | | 1.0 | 1.0 | 1.0 | 1.0 | 1.0 | 1.0 | 1.0 | 1.0 |

TABLE 8

| First water-based coating material | | D17 | D18 | D19 | D20 | D21 | D22 | D23 |
|---|---|---|---|---|---|---|---|---|
| Base resin | Core/shell type emulsion C11 | | | 25.5 | 25.5 | | | |
| | Core/shell type emulsion C12 | | | | | 25.5 | | |
| | Core/shell type emulsion C13 | | | | | | 25.5 | |
| | Core/shell type emulsion C14 | | | | | | | 25.5 |
| | Core/shell type emulsion C15 | | | | | | | |
| | Core/shell type emulsion C16 | | | | | | | |
| | Core/shell type emulsion C17 | | | | | | | |
| | Core/shell type emulsion C18 | | | | | | | |
| | Core/shell type emulsion C19 | | | | | | | |
| | Core/shell type emulsion C20 | | | | | | | |
| | Core/shell type emulsion C21 | | | | | | | |
| | Water-based polyurethane resin B1 | 47.4 | 47.4 | 23.7 | 23.7 | 23.7 | 23.7 | 23.7 |
| | Water-based polyester resin | 16.0 | 16.0 | 16.0 | 16.0 | 16.0 | 16.0 | 16.0 |

TABLE 8-continued

| First water-based coating material | | D17 | D18 | D19 | D20 | D21 | D22 | D23 |
|---|---|---|---|---|---|---|---|---|
| | Water-based acrylic resin | 5.9 | 5.9 | 5.9 | 5.9 | 5.9 | 5.9 | 5.9 |
| | Water-based polyether resin | 4.1 | 4.1 | 4.1 | 4.1 | 4.1 | 4.1 | 4.1 |
| Curing agent | Melamine resin (*1) | | | | | | | |
| | Polyisocyanate (*2) | 7.9 | | 8.6 | | 8.6 | 8.6 | 8.6 |
| | Polycarbodiimide (*3) | | 11.1 | | 8.6 | | | |
| Pigment | Titanium dioxide | 35.1 | 31.7 | 35.9 | 30.7 | 35.9 | 35.9 | 35.9 |
| | Carbon black | 0.4 | 0.4 | 0.4 | 0.4 | 0.4 | 0.4 | 0.4 |
| Total | | 116.8 | 116.6 | 120.1 | 114.9 | 120.1 | 120.1 | 120.1 |
| Base resin content | Core/shell type emulsion resin | 0% | 0% | 30% | 30% | 30% | 30% | 30% |
| | Water-based polyurethane resin | 60% | 60% | 30% | 30% | 30% | 30% | 30% |
| | Water-based polyester resin | 15% | 15% | 15% | 15% | 15% | 15% | 15% |
| | Water-based acrylic resin | 10% | 10% | 10% | 10% | 10% | 10% | 10% |
| | Water-based polyether resin | 15% | 15% | 15% | 15% | 15% | 15% | 15% |
| Total content of base resin relative to total solid resin content in first water-based coating material | | 78% | 86% | 76% | 89% | 76% | 76% | 76% |
| Curing agent content | Melamine resin (*1) | | | | | | | |
| | Polyisocyanate (*2) | 22% | | 24% | | 24% | 24% | 24% |
| | Polycarbodiimide (*3) | | 14% | | 11% | | | |
| | NCO/OH (molar ratio) | 1.0 | | 1.0 | | 1.0 | 1.0 | 1.0 |
| | CI/COOH (molar ratio) | | 1.0 | | 1.0 | | | |
| P/B | | 1.0 | 1.0 | 1.0 | 1.0 | 1.0 | 1.0 | 1.0 |

TABLE 9

| First water-based coating material | | D24 | D25 | D26 | D27 | D28 | D29 | D30 |
|---|---|---|---|---|---|---|---|---|
| Base resin | Core/shell type emulsion C11 | | | | | | | |
| | Core/shell type emulsion C12 | | | | | | | |
| | Core/shell type emulsion C13 | | | | | | | |
| | Core/shell type emulsion C14 | | | | | | | |
| | Core/shell type emulsion C15 | 25.5 | | | | | | |
| | Core/shell type emulsion C16 | | 25.5 | | | | | |
| | Core/shell type emulsion C17 | | | 25.5 | | | | |
| | Core/shell type emulsion C18 | | | | 25.5 | | | |
| | Core/shell type emulsion C19 | | | | | 25.5 | | |
| | Core/shell type emulsion C20 | | | | | | 25.5 | |
| | Core/shell type emulsion C21 | | | | | | | 25.5 |
| | Water-based polyurethane resin B1 | 47.4 | 47.4 | 23.7 | 23.7 | 23.7 | 23.7 | 23.7 |
| | Water-based polyester resin | 16.0 | 16.0 | 16.0 | 16.0 | 16.0 | 16.0 | 16.0 |
| | Water-based acrylic resin | 5.9 | 5.9 | 5.9 | 5.9 | 5.9 | 5.9 | 5.9 |
| | Water-based polyether resin | 4.1 | 4.1 | 4.1 | 4.1 | 4.1 | 4.1 | 4.1 |
| Curing agent | Melamine resin (*1) | | | | | | | |
| | Polyisocyanate (*2) | 8.6 | 8.6 | 8.6 | 8.6 | 8.6 | 8.6 | 8.6 |
| | Polycarbodiimide (*3) | | | | | | | |
| Pigment | Titanium dioxide | 35.9 | 35.9 | 35.9 | 35.9 | 35.9 | 35.9 | 35.9 |
| | Carbon black | 0.4 | 0.4 | 0.4 | 0.4 | 0.4 | 0.4 | 0.4 |
| Total | | 120.1 | 120.1 | 120.1 | 120.1 | 120.1 | 120.1 | 120.1 |
| Base resin content | Core/shell type emulsion resin | 30% | 30% | 30% | 30% | 30% | 30% | 30% |
| | Water-based polyurethane resin | 30% | 30% | 30% | 30% | 30% | 30% | 30% |
| | Water-based polyester resin | 15% | 15% | 15% | 15% | 15% | 15% | 15% |
| | Water-based acrylic resin | 10% | 10% | 10% | 10% | 10% | 10% | 10% |
| | Water-based polyether resin | 15% | 15% | 15% | 15% | 15% | 15% | 15% |
| Total content of base resin relative to total solid resin content in first water-based coating material | | 76% | 76% | 76% | 76% | 76% | 76% | 76% |
| Curing agent content | Melamine resin (*1) | | | | | | | |
| | Polyisocyanate (*2) | 24% | 24% | 24% | 24% | 24% | 24% | 24% |
| | Polycarbodiimide (*3) | | | | | | | |
| | NCO/OH (molar ratio) | 1.0 | 1.0 | 1.0 | 1.0 | 1.0 | 1.0 | 1.0 |
| | CI/COOH (molar ratio) | | | | | | | |
| P/B | | 1.0 | 1.0 | 1.0 | 1.0 | 1.0 | 1.0 | 1.0 |

Notes for tables 6 to 9
(*1) Product name "Cymel 327", produced by Cytec Industries
(*2) Product name "Bayhydur 3100", produced by Sumitomo Bayer Urethane Co., Ltd.
(*3) Product name "Carbodilite V-02-L2", produced by Nisshinbo Chemical, Inc.

Production Example 5-1: Production of Second Water-Based Coating Material (E1)

Using the core/shell type emulsion (C1) and a water-based polyester resin (product name "SETAQUA6407", produced by Nuplex Resins, acid value 11 mg KOH/g, hydroxyl group value 89 mg KOH/g) as dispersing resins, a pigment paste was produced by dispersing carbon black (product name "MA-100", produced by Mitsubishi Chemical Corporation) in a motor mill. Next, the core/shell type emulsion (C1), the aforementioned water-based polyester resin, 23.7 parts of the water-based polyurethane resin (B1), 5.9 parts of a water-based acrylic resin (product name "SETAQUA6511", produced by Nuplex Resins, acid value 8 mg KOH/g, hydroxyl group value 138 mg KOH/g, glass transition temperature 12° C.) and 4.1 parts of a water-based polyether resin (product name "Yuniol TG-1000", produced by NOF Corporation, acid value 0 mg KOH/g, hydroxyl group value 168 mg KOH/g, number average molecular weight 1,000) were mixed in a dissolver, and a second water-based coating material (E1) was obtained by adding and dispersing the aforementioned pigment paste to the aforementioned mixture so that the content of the core/shell type emulsion (C1) was 25.5 parts, the content of the aforementioned water-based polyester resin was 16.0 parts and the P/B ratio was 0.07 in the second water-based coating material (E1).

Production Examples 5-2 to 5-17: Production of Second Water-Based Coating Materials (E2 to E17)

Based on the formulations shown in tables 10 and 11, second water-based coating materials (E2 to E17) were obtained using the same method as that used in Production Example 5-1. When producing the second water-based coating materials (E2 to E17), a primary component was obtained by adding and blending the pigment paste in the base resin and then adding and blending the curing agent so as to obtain the second water-based coating material.

TABLE 10

| Second water-based coating material | | E1 | E2 | E3 | E4 | E5 | E6 | E7 | E8 |
|---|---|---|---|---|---|---|---|---|---|
| Base resin | Core/shell type emulsion C1 | 25.5 | 25.5 | 25.5 | 25.5 | 8.5 | 42.5 | 68.1 | 85.1 |
|  | Core/shell type emulsion C2 | | | | | | | | |
|  | Core/shell type emulsion C3 | | | | | | | | |
|  | Core/shell type emulsion C4 | | | | | | | | |
|  | Core/shell type emulsion C5 | | | | | | | | |
|  | Core/shell type emulsion C6 | | | | | | | | |
|  | Core/shell type emulsion C7 | | | | | | | | |
|  | Core/shell type emulsion C8 | | | | | | | | |
|  | Core/shell type emulsion C9 | | | | | | | | |
|  | Core/shell type emulsion C10 | | | | | | | | |
|  | Water-based polyurethane resin B1 | 23.7 | 23.7 | 23.7 | 23.7 | 39.5 | 7.9 | 4.0 | |
|  | Water-based polyester resin | 16.0 | 16.0 | 16.0 | 16.0 | 16.0 | 16.0 | 5.3 | |
|  | Water-based acrylic resin | 5.9 | 5.9 | 5.9 | 5.9 | 5.9 | 5.9 | 2.9 | |
|  | Water-based polyether resin | 4.1 | 4.1 | 4.1 | 4.1 | 4.1 | 4.1 | 1.4 | |
| Curing agent | Melamine resin (*1) | | 13.2 | | | 13.2 | 13.2 | 13.2 | 13.2 |
|  | Polyisocyanate (*2) | | | 8.6 | | | | | |
|  | Polycarbodiimide (*3) | | | | 8.6 | | | | |
| Pigment | Carbon black | 2.0 | 2.9 | 2.7 | 2.3 | 2.9 | 2.9 | 2.9 | 2.9 |
| Total | | 77.2 | 91.3 | 86.5 | 86.1 | 90.1 | 92.5 | 97.7 | 101.2 |
| Base resin content | Core/shell type emulsion resin | 30% | 30% | 30% | 30% | 10% | 50% | 80% | 100% |
|  | Water-based polyurethane resin | 30% | 30% | 30% | 30% | 50% | 10% | 5% | |
|  | Water-based polyester resin | 15% | 15% | 15% | 15% | 15% | 15% | 5% | |
|  | Water-based acrylic resin | 10% | 10% | 10% | 10% | 10% | 10% | 5% | |
|  | Water-based polyether resin | 15% | 15% | 15% | 15% | 15% | 15% | 5% | |
| Total content of base resin relative to total solid resin content in second water-based coating material | | 100% | 71% | 76% | 89% | 71% | 71% | 71% | 71% |
| Curing agent content | Melamine resin (*1) | | 30% | | | 30% | 30% | 30% | 30% |
|  | Polyisocyanate (*2) | | | 24% | | | | | |
|  | Polycarbodiimide (*3) | | | | 11% | | | | |
|  | NCO/OH | | | 100% | | | | | |
|  | Cl/COOH | | | | 100% | | | | |
| P/B | | 0.1 | 0.1 | 0.1 | 0.1 | 0.1 | 0.1 | 0.1 | 0.1 |

TABLE 11

| Second water-based coating material | | E9 | E10 | E11 | E12 | E13 | E14 | E15 | E16 | E17 |
|---|---|---|---|---|---|---|---|---|---|---|
| Base resin | Core/shell type emulsion C1 | | | | | | | | | |
|  | Core/shell type emulsion C2 | 25.5 | | | | | | | | |
|  | Core/shell type emulsion C3 | | 25.5 | | | | | | | |
|  | Core/shell type emulsion C4 | | | 25.5 | | | | | | |
|  | Core/shell type emulsion C5 | | | | 25.5 | | | | | |
|  | Core/shell type emulsion C6 | | | | | 25.5 | | | | |
|  | Core/shell type emulsion C7 | | | | | | 25.5 | | | |
|  | Core/shell type emulsion C8 | | | | | | | 25.5 | | |

TABLE 11-continued

| Second water-based coating material | | | E9 | E10 | E11 | E12 | E13 | E14 | E15 | E16 | E17 |
|---|---|---|---|---|---|---|---|---|---|---|---|
| | | Core/shell type emulsion C9 | | | | | | | | 25.5 | |
| | | Core/shell type emulsion C10 | | | | | | | | | 25.5 |
| | | Water-based polyurethane resin B1 | 23.7 | 23.7 | 23.7 | 23.7 | 23.7 | 23.7 | 23.7 | 23.7 | 23.7 |
| | | Water-based polyester resin | 16.0 | 16.0 | 16.0 | 16.0 | 16.0 | 16.0 | 16.0 | 16.0 | 16.0 |
| | | Water-based acrylic resin | 5.9 | 5.9 | 5.9 | 5.9 | 5.9 | 5.9 | 5.9 | 5.9 | 5.9 |
| | | Water-based polyether resin | 4.1 | 4.1 | 4.1 | 4.1 | 4.1 | 4.1 | 4.1 | 4.1 | 4.1 |
| Curing agent | Melamine resin (*1) | | 13.2 | 13.2 | 13.2 | 13.2 | 13.2 | 13.2 | 13.2 | 13.2 | 13.2 |
| | Polyisocyanate (*2) | | | | | | | | | | |
| | Polycarbodiimide (*3) | | | | | | | | | | |
| Pigment | Carbon black | | 2.9 | 2.9 | 2.9 | 2.9 | 2.9 | 2.9 | 2.9 | 2.9 | 2.9 |
| Total | | | 91.3 | 91.3 | 91.3 | 91.3 | 91.3 | 91.3 | 91.3 | 91.3 | 91.3 |
| Base resin content | Core/shell type emulsion resin | | 30% | 30% | 30% | 30% | 30% | 30% | 30% | 30% | 30% |
| | Water-based polyurethane resin | | 30% | 30% | 30% | 30% | 30% | 30% | 30% | 30% | 30% |
| | Water-based polyester resin | | 15% | 15% | 15% | 15% | 15% | 15% | 15% | 15% | 15% |
| | Water-based acrylic resin | | 10% | 10% | 10% | 10% | 10% | 10% | 10% | 10% | 10% |
| | Water-based polyether resin | | 15% | 15% | 15% | 15% | 15% | 15% | 15% | 15% | 15% |
| Total content of base resin relative to total solid resin content in second water-based coating material | | | 71% | 71% | 71% | 71% | 71% | 71% | 71% | 71% | 71% |
| Curing agent content | Melamine resin (*1) | | 30% | 30% | 30% | 30% | 30% | 30% | 30% | 30% | 30% |
| | Polyisocyanate (*2) | | | | | | | | | | |
| | Polycarbodiimide (*3) | | | | | | | | | | |
| | NCO/OH | | | | | | | | | | |
| | Cl/COOH | | | | | | | | | | |
| P/B | | | 0.1 | 0.1 | 0.1 | 0.1 | 0.1 | 0.1 | 0.1 | 0.1 | 0.1 |

Working Example 1

A cationic electrodeposition coating material (product name "CathoGuard 500", produced by BASF Coatings) was coated by electrostatic deposition on a zinc phosphate-treated mild steel plate so as to have a film thickness after drying of 20 μm, and then fired for 25 minutes at 175° C. so as to obtain an electrodeposition coating plate used in the present evaluation (hereinafter referred to as the "electrodeposited plate").

Next, an evaluation plate was prepared using a rotary atomization type bell coater (product name "Metallic bell G1-COPES bell", manufactured by ABB at a temperature of 25° C. and a relative humidity of 75% using the flows mentioned below. Moreover, when forming the following multilayer coating films, the first water-based coating material and second water-based coating material were coated after being diluted with deionized water so that the viscosity was 40 seconds (at 20° C.) when using a Ford Cup #4.

The electrodeposited plate was coated with the first water-based coating material (D1) so that the film thickness after drying was 20 μm. The plate was then allowed to stand at room temperature for 5 minutes and then coated with the second water-based coating material (E1) so that the film thickness after drying was 12 μm. The plate was then allowed to stand for 5 minutes at room temperature and then subjected to preliminary heating at 80° C. for 3 minutes. After allowing the plate to cool to room temperature, a clear coating material (product name "Belcoat 7300", produced by BASF Coatings) was coated on the plate so that the film thickness after drying was 30 μm. Following this coating, the plate was allowed to stand at room temperature for 10 minutes and then fired at 140° C. for 30 minutes so as to produce an evaluation plate.

The obtained evaluation plate was subjected to the following coating film performance tests, results of which are shown in table 11.

(1) Coating Film Appearance

The appearance of the coating film on the obtained evaluation plate was visually evaluated according to the following criteria.

◎: When the coating film was illuminated with fluorescent light, the fluorescent light appeared very sharp.

□+: When the coating film was illuminated with fluorescent light, the fluorescent light appeared sharp.

□: When the coating film was illuminated with fluorescent light, the fluorescent light appeared slightly sharp.

□−: When the coating film was illuminated with fluorescent light, the edge (periphery) of the fluorescent light was slightly blurred.

x: When the coating film was illuminated with fluorescent light, the edge (periphery) of the fluorescent light was extremely blurred.

(2) Adhesion to an Object to be Coated

The coating film on the obtained evaluation plate was divided into 100 grid cells measuring 2 mm×2 mm using a cutter knife, Sellotape was strongly bonded to the grid cells and the edge of the tape was peeled off at an angle of 45° in a single movement, after which state of the grid cells was observed and evaluated as follows.

□: No peeling off of coating film observed x: Peeling off of coating film observed

Working Examples 2 to 23, Comparative Examples 1 to 14

Using the first water-based coating materials, second water-based coating materials and clear coating materials shown in tables 12 to 15, evaluation plates were prepared and coating film performance evaluations were carried out in the same way as in Working Example 1. The results of the coating film performance evaluations are also shown in tables 12 to 15.

TABLE 12

|  | Working Example | | | | | | | | | | |
|---|---|---|---|---|---|---|---|---|---|---|---|
|  | 1 | 2 | 3 | 4 | 5 | 6 | 7 | 8 | 9 | 10 | 11 |
| First water-based coating material | D1 | D1 | D1 | D1 | D2 | D3 | D4 | D5 | D6 | D7 | D8 |
| Second water-based coating material | E1 | E2 | E3 | E4 | E5 | E6 | E7 | E8 | E9 | E10 | E11 |
| Clear coating material (*1) | 1 K | 1 K | 1 K | 1 K | 1 K | 1 K | 1 K | 1 K | 1 K | 1 K | 1 K |
| Coating film appearance | ○ | ○ | ○ | ○ | ○− | ○− | ○− | ○− | ○− | ○− | ○− |
| Adhesion to substrate | ○ | ○ | ○ | ○ | ○ | ○ | ○ | ○ | ○ | ○ | ○ |

TABLE 13

|  | Working Example | | | | | | | | | | | |
|---|---|---|---|---|---|---|---|---|---|---|---|---|
|  | 12 | 13 | 14 | 15 | 16 | 17 | 18 | 19 | 20 | 21 | 22 | 23 |
| First water-based coating material | D9 | D10 | D11 | D12 | D13 | D14 | D15 | D16 | D1 | D15 | D16 | D15 |
| Second water-based coating material | E12 | E13 | E14 | E15 | E16 | E17 | E2 | E2 | E2 | E2 | E2 | E3 |
| Clear coating material (*1) | 1 K | 1 K | 1 K | 1 K | 1 K | 1 K | 1 K | 1 K | 2 K | 2 K | 2 K | 2 K |
| Coating film appearance | ○− | ○− | ○− | ○− | ○− | ○− | ○+ | ○+ | ○+ | ○+ | ○+ | ◎ |
| Adhesion to substrate | ○ | ○ | ○ | ○ | ○ | ○ | ○ | ○ | ○ | ○ | ○ | ○ |

TABLE 14

|  | Comparative Example | | | | | | |
|---|---|---|---|---|---|---|---|
|  | 1 | 2 | 3 | 4 | 5 | 6 | 7 |
| First water-based coating material | D17 | D18 | D19 | D20 | D21 | D22 | D23 |
| Second water-based coating material | E3 | E3 | E3 | E3 | E3 | E3 | E3 |
| Clear coating material (*1) | 2 K | 2 K | 2 K | 2 K | 2 K | 2 K | 2 K |
| Coating film appearance | X | X | ○ | ○ | X | X | X |
| Adhesion to substrate | ○ | ○ | X | X | ○ | ○ | ○ |

TABLE 15

|  | Comparative Example | | | | | | |
|---|---|---|---|---|---|---|---|
|  | 8 | 9 | 10 | 11 | 12 | 13 | 14 |
| First water-based coating material | D24 | D25 | D26 | D27 | D28 | D29 | D30 |
| Second water-based coating material | E3 | E3 | E3 | E3 | E3 | E3 | E3 |
| Clear coating material (*1) | 2 K | 2 K | 2 K | 2 K | 2 K | 2 K | 2 K |
| Coating film appearance | X | X | X | X | X | X | X |
| Adhesion to substrate | ○ | ○ | ○ | ○ | ○ | ○ | ○ |

Notes for tables 12 to 15
(*1):
1 K: Acrylic resin/melamine-curable clear coating material, product name "Belcoat 7300", produced by BASF Coatings
2 K: Acrylic resin/isocyanate-curable clear coating material, product name "Evergloss", produced by BASF Coatings.

The invention claimed is:

1. A water-based coating composition comprising a core/shell type emulsion resin comprising an acrylic resin as the core portion and a polyurethane resin as the shell portion, wherein the mass ratio of the core portion and the shell portion in the aforementioned core/shell type emulsion resin is between 20/80 and 80/20, the acrylic resin has a hydroxyl group value of 40 to 140 mg KOH/g and an acid value of 0 to 10 mg KOH/g, the polyurethane resin has a hydroxyl group value of 20 to 80 mg KOH/g and an acid value of 10 to 60 mg KOH/g, and the total mass ratio of constituent units derived from dibasic acids and/or dihydric alcohols having 10 to 60 carbon atoms in the polyurethane resin is 10 to 50 mass % relative to the solid resin content of the polyurethane resin.

2. The water-based coating composition of claim 1, wherein the mass ratio of the core portion and the shell portion in the core/shell type emulsion resin is between 45/55 and 55/45, the acid value of the polyurethane resin is 30 to 40 mg KOH/g, and the total mass ratio of constituent units derived from dibasic acids and/or dihydric alcohols having 34 to 38 carbon atoms in the polyurethane resin is 30 to 35 mass % relative to the solid resin content of the polyurethane resin.

3. The water-based coating composition of claim 1, wherein the mass ratio of the core/shell type emulsion resin is 5 to 80 mass % relative to the total quantity of solid resin content in the core/shell type emulsion resin.

4. The water-based coating composition of claim 1, wherein the mass ratio of the core/shell type emulsion resin is 10 to 40 mass % relative to the total quantity of solid resin content in the core/shell type emulsion resin.

5. A method for forming a multilayer coating film comprising:

coating a first water-based coating material (A) on an object to be coated so as to form an uncured first coating film;

coating a second water-based coating material (B) on the uncured first coating film, without carrying out preliminary heating or thermal curing following the formation of said first coating film, so as to form an uncured second coating film;

coating a clear coating material (C) on the uncured second coating film so as to form a clear coating film; and simultaneously thermally curing the uncured first coating film, the uncured second coating film, and the clear coating film, wherein the first water-based coating material (A) and second water-based coating material (B) are selected from the water-based coating composition of claim 1.

6. The method for forming a multilayer coating film of claim 5, wherein the first water-based coating material (A) and second water-based coating material (B) contain a polyisocyanate compound and/or a polycarbodiimide compound as a curing agent.

7. The method for forming a multilayer coating film of claim 5, wherein the clear coating material (C) comprises a hydroxyl group-containing acrylic resin and a polyisocyanate compound.

8. A coating film made by the method for forming a multilayer coating film of claim 5.

* * * * *